United States Patent [19]
Rydelek

[11] Patent Number: 5,412,446
[45] Date of Patent: May 2, 1995

[54] FILM ASSEMBLY APPARATUS AND METHOD FOR SINGLE-USE CAMERA EMPLOYING FILM SECUREMENT WEB

[75] Inventor: James G. Rydelek, Rochester, N.Y.

[73] Assignee: Eastman Kodak Company, Rochester, N.Y.

[21] Appl. No.: 198,006

[22] Filed: Feb. 17, 1994

[51] Int. Cl.⁶ ............................................. G03B 1/32
[52] U.S. Cl. .................. 354/212; 242/332.7; 242/582
[58] Field of Search ............... 354/212, 216, 170, 171; 242/74, 332, 332.4, 332.7, 582

[56] References Cited

U.S. PATENT DOCUMENTS

| | | | |
|---|---|---|---|
| 1,411,982 | 4/1922 | Thrasher | 430/501 |
| 2,792,185 | 5/1957 | Julliard | 242/582 |
| 2,900,868 | 8/1959 | Gaffney | 242/582 X |
| 3,106,364 | 10/1963 | Knudsen | 242/582 |
| 3,521,829 | 7/1970 | Wangerin | 242/332.7 |
| 3,698,654 | 10/1972 | Rosenburgh | 242/332 |
| 3,744,731 | 7/1973 | Ataka et al. | 242/579 |
| 3,756,528 | 9/1973 | Ohmura | 242/582 X |
| 4,173,315 | 11/1979 | Clausser | 242/582 X |
| 4,831,398 | 5/1989 | Nakayama et al. | 354/212 |
| 4,884,087 | 11/1989 | Mochida et al. | 354/212 X |
| 4,972,649 | 11/1990 | Mochida et al. | 354/212 X |
| 5,317,356 | 5/1994 | Dassero | 354/288 |

FOREIGN PATENT DOCUMENTS 4-119449 10/1992 Japan.

Primary Examiner—Howard B. Blankenship
Assistant Examiner—J. K. Han
Attorney, Agent, or Firm—Foger A. Fields

[57] ABSTRACT

A single-use camera comprises a main body portion having an exposure opening, a rotatable spool at one side of the exposure opening in the main body portion, a film cassette having a leading section of a filmstrip protruding from the cassette at another side of the exposure opening, a rotatable sprocket wheel between the spool and the film cassette for engaging the leading section of the filmstrip, and an elongate web attached to the spool and longitudinally extending from the spool to a location beyond the sprocket wheel. To load the camera, a leading section of the filmstrip is positioned beneath the web in engagement with the sprocket wheel. The sprocket wheel is rotated in engagement with the leading section of the filmstrip to advance the leading section beneath the web onto the spool. Then the spool is rotated to wrap the web about the spool and secure the leading section of the filmstrip to the spool.

5 Claims, 3 Drawing Sheets es, commonly referred to as single-use or disposable cameras, have recently become well known. Typically, the single-use camera is a simple point-and-shoot type which comprises a plastic light-tight housing with a fixed-focus taking lens, a film metering mechanism including a rotatable sprocket wheel, a single blade shutter, a frame (exposure) counter, possibly a built-in electronic flash unit, and a decorative cardboard casing containing the light-tight housing and having respective openings for the taking lens, a shutter release button, a manual film advance thumbwheel, a direct see-through viewfinder, the frame counter, and a flash emission window. At the manufacturer, the light-tight housing is loaded with a 12, 24, or 36 exposure 35 mm film cassette and substantially the entire length of the unexposed filmstrip is factory prewound from the cassette onto a spool in the housing or simply into a roll. Then, after the photographer takes a picture, he or she rotates the thumbwheel to rewind the exposed frame into the cassette. The rewinding movement of the filmstrip the equivalent of slightly more than one frame width rotates the sprocket wheel to decrement the frame counter to its next lower-numbered setting. Further details of this operation are disclosed in commonly assigned U.S. Pat. No. 5,235,366, issued Aug. 10, 1993, and in U.S. Pat. 4,890,130, issued Dec. 26, 1989. When the maximum number of exposures available on the filmstrip are exposed and the filmstrip is completely rewound into the cassette, the camera is given to a photofinisher who first removes the cassette with the filmstrip from the housing to develop the negatives and then forwards the camera to the manufacturer for recycling. The manufacturer, in turn, recycles the camera by loading it with another roll of film and repeating the foregoing prewinding process.

Prior art U.S. Pat. No. 1,411,982, issued Apr. 4, 1922, discloses a roll film camera in which, to load a roll film in the camera, a rear cover or lid must be opened and a supply spool with the roll film coiled about the spool is placed in a chamber at one side of an exposure or back-frame opening. A string connected to a leading section of the roll film must be secured to a take-up spool in a chamber at an opposite side of the exposure opening. Then the rear cover is closed and an exterior manual winding key for the take-up spool is rotated to wind the string onto the take-up spool and pull the film across the exposure opening to the take-up spool. If, however, the string is broken, the system fails.

SUMMARY OF THE INVENTION

According to one aspect of the invention, a single-use camera comprising a main body portion having an exposure opening, a rotatable spool at one side of the exposure opening in the main body portion, a film cassette having a leading section of a filmstrip protruding from the cassette at another side of the exposure opening, and a rotatable sprocket wheel between the spool and the film cassette for engaging the leading section of the filmstrip, is characterized in that:

an elongate web is attached to the spool to be wrapped about the spool, when the spool is rotated in a winding direction, and longitudinally extends from the spool to a location beyond the sprocket wheel to overlie the leading section of the filmstrip, when the leading section is engaged with the sprocket wheel, in order that rotation of the sprocket wheel will advance the leading section beneath the web onto the spool to make rotation of the spool in the winding direction secure the leading section to the spool by wrapping the web about the spool.

According to another aspect of the invention, a method of assembling a single-use camera comprising a main body portion having an exposure opening, a rotatable spool at one side of the exposure opening in the main body portion, a film cassette having a leading section of a filmstrip protruding from the cassette at another side of the exposure opening, a rotatable sprocket wheel between the spool and the film cassette for engaging the leading section of the filmstrip, and an elongate web attached to the spool and longitudinally extending from the spool to a location beyond the sprocket wheel, is characterized by the following steps:

positioning a leading section of the filmstrip beneath the web in engagement with the sprocket wheel;

rotating the sprocket wheel in engagement with the leading section of the filmstrip to advance the leading section beneath the web onto the spool; and rotating the spool to wrap the web about the spool and secure the leading section of the filmstrip to the spool.

Since in the invention the web is not used to pull the leading section of the filmstrip to the take-up spool as in prior art U.S. Pat. No. 1,411,982, there is no danger of a failure. Also, film loading can be accomplished with the camera closed.

DETAILED DESCRIPTION OF THE INVENTION

The invention is disclosed as being embodied preferably in a single-use camera. Because the features of a single-use camera are generally known, the description which follows is directed in particular only to those elements forming part of or cooperating directly with the disclosed embodiment. It is to be understood, however, that other elements may take various forms known to a person of ordinary skill in the art.

Figure 1:
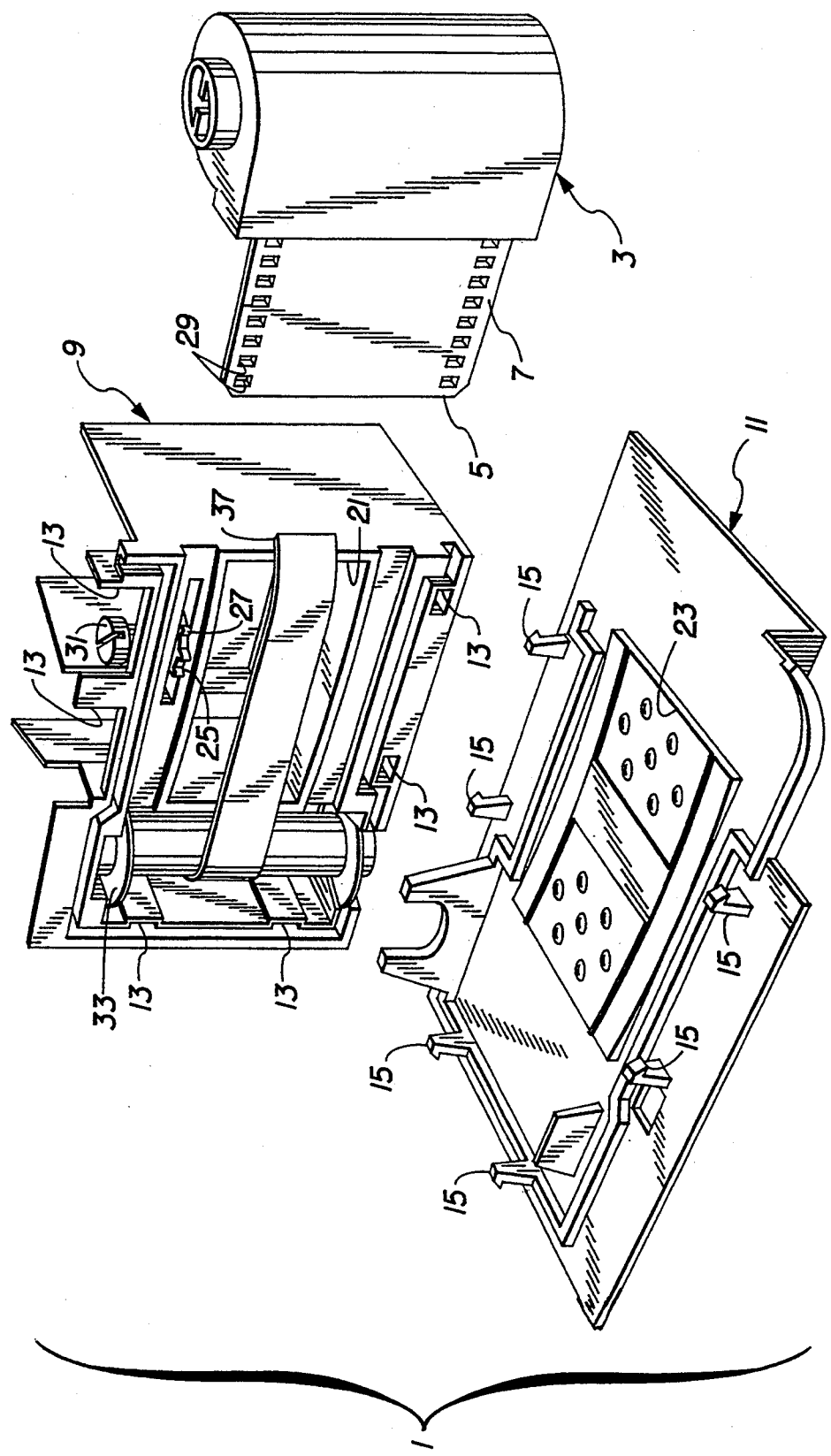
FIG. 1 is an exploded top rear perspective view of a single-use camera according to a preferred embodiment of the invention, showing a rear cover portion of the camera removed from a main body portion of the camera.
Figure 2:
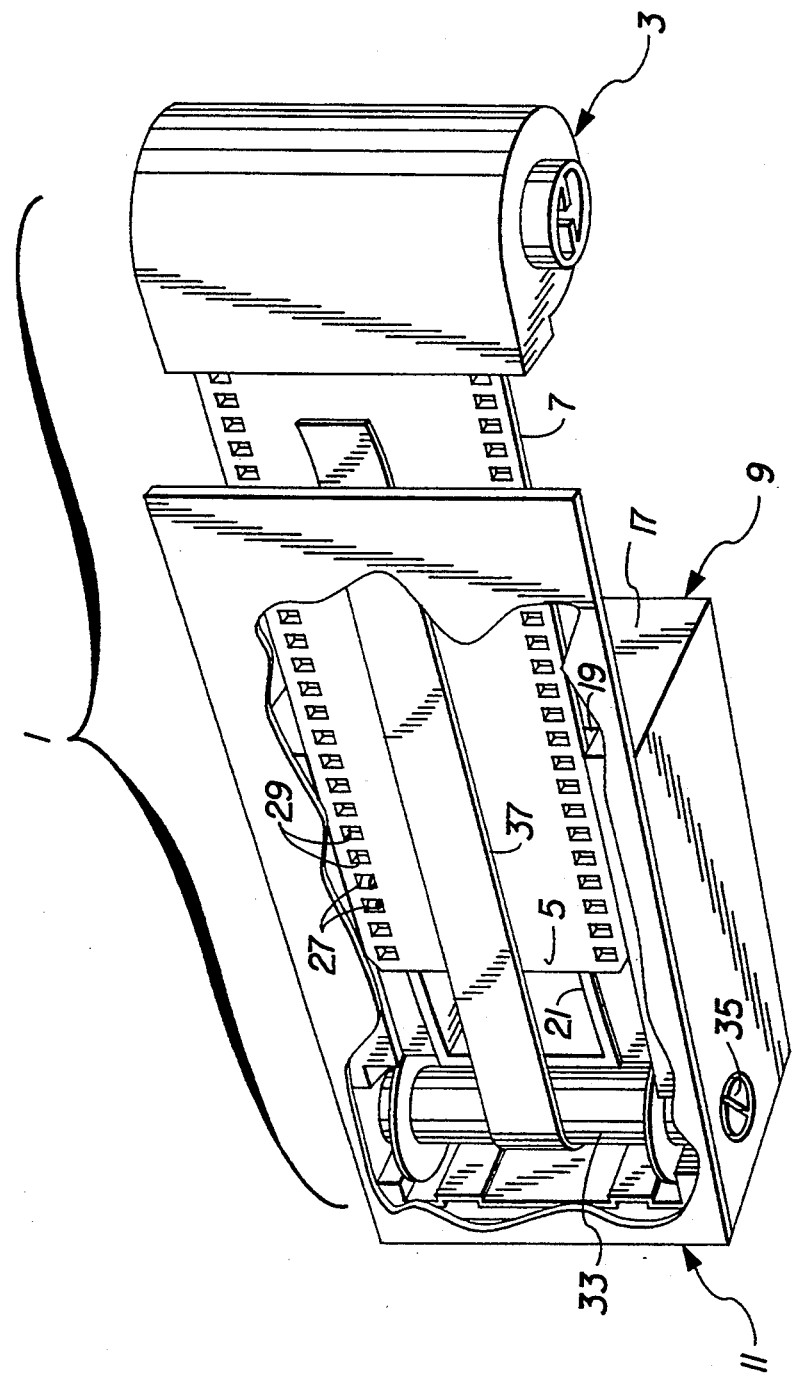
FIG. 2 and FIG. 3 are assembled bottom rear perspective views of the camera, showing a film loading operation according to a preferred embodiment of the invention.
Figure 3:
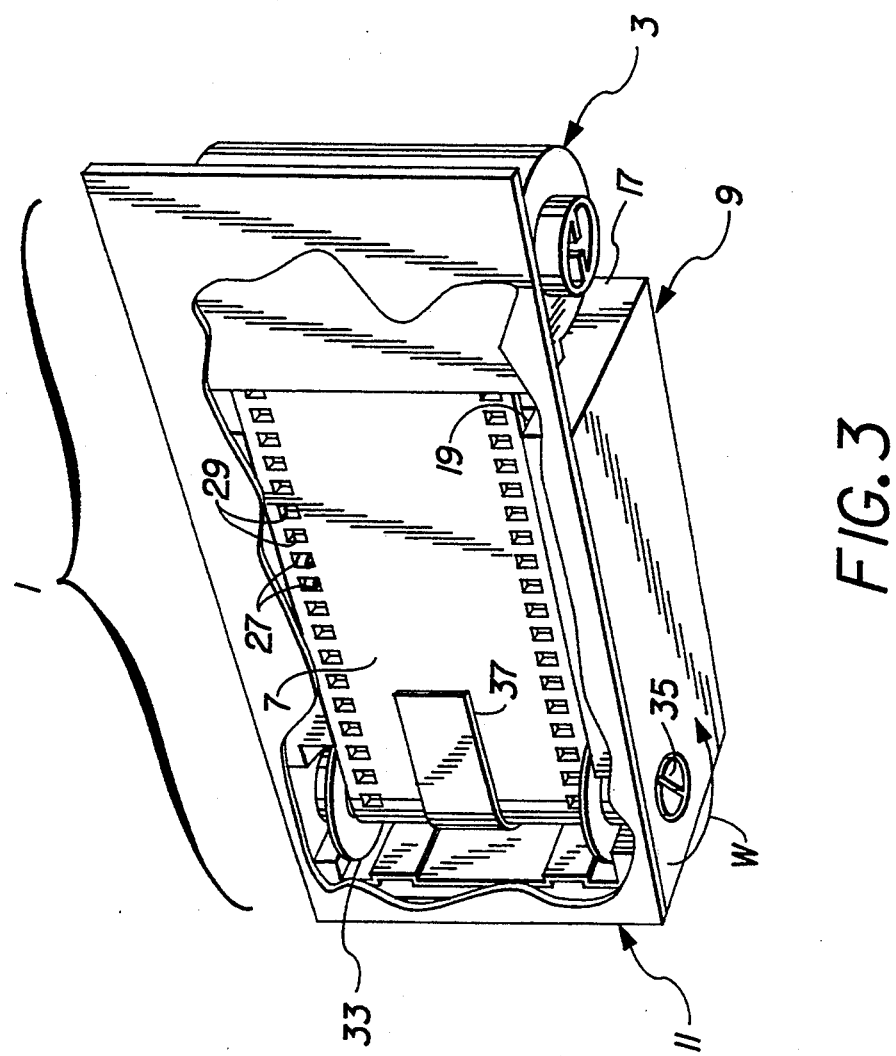

Referring now to the drawings, FIGS. 1–3 show a single-use camera 1 comprising a known 35 mm film cassette 3 having a protruding leading section 5 of a filmstrip 7, which for the most part is stored in roll form inside the cassette, and a plastic main body portion 9 and a plastic rear cover portion 11 having respective like-number holes 13 and short flexible prongs 15 that mate to removably connect the rear cover portion to the main body portion. When the rear cover portion 11 is connected to the main body portion 9 as shown in FIGS. 2 and 3, they together define a chamber 17 for the film cassette 3 which includes a film ingress slot 19 for passage of the leading film section 5 into the main body portion. The film ingress slot 19 can include known light-trapping material such as plush or velvet, not shown, to prevent ambient light from entering through the slot to the interior of the connected main body portion 9 and rear cover portion 11. Also, a front cover portion, not shown, is to be connected to the main body portion 9.

The main body portion 9 has an exposure or backframe opening 21 intended to be located opposite a film pressure pad 23 integrally formed with the rear cover portion 11. A known taking lens and shutter, not shown, are located in front of the exposure opening 21. A sprocket wheel 25 having successive teeth 27 for engaging the filmstrip 7 including its leading section 5 at respective film perforations 29 is rotatably supported inside the main body portion 9. The sprocket wheel 25 can be manually or automatically rotated from outside the main body portion 9 by temporarily engaging a first rotational device such as a screwdriver, not shown, to a top auxiliary head 31 coaxially connected to the sprocket wheel. A take-up spool 33 is rotatably supported inside the main body portion 9. The take-up spool 33 can be manually or automatically rotated from outside the main body portion 9 by temporarily engaging a second rotational device such as a screwdriver, not shown, to a bottom auxiliary head 35 coaxially connected to the take-up spool. An elongate web 37 is attached to the take-up spool 33 and longitudinally extends from the spool, across the exposure opening 21, though the film ingress slot 19, and into the chamber 17 for the film cassette 3. See FIGS. 1 and 2.

Operation (Method)

Beginning with FIG. 2, the leading film section 5 is inserted through the film ingress slot 19 beneath the web 37 and into engagement with at least one of the teeth 27 of the sprocket wheel 25. Then a screwdriver or the like is temporarily engaged with the top auxiliary head 31 and manually or automatically rotated to rotate the sprocket wheel 25 in order to advance the leading film section 5 beneath the web 37 to the take-up spool 33. As the leading film section 5 is advanced towards the take-up spool 33, the film cassette 3 is manually or automatically positioned in the chamber 17. Of course, rotation of the sprocket wheel 25 may begin before the leading film section 5 is moved into engagement with at least one of the teeth 27 of the sprocket wheel. If the leading film section 5 is short enough, the film cassette 3 can be positioned in the chamber 17 at the same time the leading film section is moved into engagement with the sprocket wheel 25.

Once the forward tip of the leading film section 5 is positioned beneath the web 37 on the take-up spool 33, a screwdriver or the like is temporarily engaged with the bottom auxiliary head 35 and manually or automatically rotated to rotate the spool in a winding direction as indicated by an arrow W in FIG. 3. This causes the web 37 to be wrapped about the take-up spool 33 to thereby secure the leading film section 5 firmly to the spool.

The invention has been described with reference to a preferred embodiment. However, it will be appreciated that variations and modifications can be effected by a person of ordinary skill in the art without departing from the scope of the invention.

PARTS LIST FOR FIGS. 1-3

1. single-use camera
3. film cassette
5. leading film section
7. filmstrip
9. main body portion
11. rear cover portion
13. holes
15. prongs
17. chamber
19. film ingress slot
21. exposure opening
23. film pressure pad
25. sprocket wheel
27. teeth
29. film perforations
31. top auxiliary head
33. take-up spool
35. bottom auxiliary head
37. web
W. spool winding direction

What is claimed is:

1. A single-use camera comprising a main body portion having an exposure opening, a rotatable spool at one side of said exposure opening in said main body portion, a film cassette having a leading section of a filmstrip protruding from said cassette at another side of said exposure opening, and a rotatable sprocket wheel between said spool and said film cassette for engaging said leading section of the filmstrip, is characterized in that:

an elongate web is attached to said spool to be wrapped about the spool, when the spool is rotated in a winding direction, and longitudinally extends from the spool to a location beyond said sprocket wheel to overlie said leading section of the filmstrip, when the leading section is engaged with the sprocket wheel, in order that rotation of the sprocket wheel will advance the leading section beneath said web onto the spool to make rotation of the spool in the winding direction secure the leading section to the spool by wrapping the web about the spool.

2. A single-use camera as recited in claim 1, wherein a rear cover portion is connected to said main body portion, said main body portion and said rear cover portion together define a chamber for said film cassette which includes a film ingress slot for passage of said leading section of the filmstrip from said chamber onto said sprocket wheel, and said web extends through said slot into said chamber.

3. A single-use camera as recited in claim 1, wherein said spool and said sprocket wheel are each adapted to be independently rotated from outside said main body portion at respective external portions of the spool and the sprocket wheel.

4. A method of assembling a single-use camera comprising a main body portion having an exposure opening, a rotatable spool at one side of the exposure opening in the main body portion, a film cassette having a leading section of a filmstrip protruding from the cassette at another side of the exposure opening, a rotatable sprocket wheel between the spool and the film cassette for engaging the leading section of the filmstrip, and an elongate web attached to the spool and longitudinally extending from the spool to a location beyond the sprocket wheel, said method characterized by the following steps:

positioning a leading section of the filmstrip beneath the web in engagement with the sprocket wheel;

rotating the sprocket wheel in engagement with the leading section of the filmstrip to advance the leading section beneath the web onto the spool; and rotating the spool to wrap the web about the spool and secure the leading section of the filmstrip to the spool.

5. A method as recited in claim 4, wherein the sprocket wheel and the spool are independently rotated from outside the main body portion by engaging respective external portions of the spool and the sprocket wheel.

* * * * *